Jan. 16, 1973 R. RESCHKE 3,711,348
METHOD OF MAKING MULTI-PLY CONVEYOR BELTING
Filed Oct. 15, 1970 2 Sheets-Sheet 1
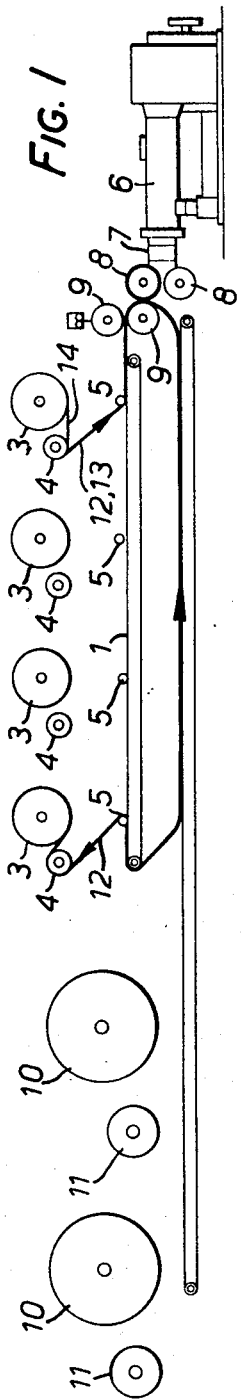
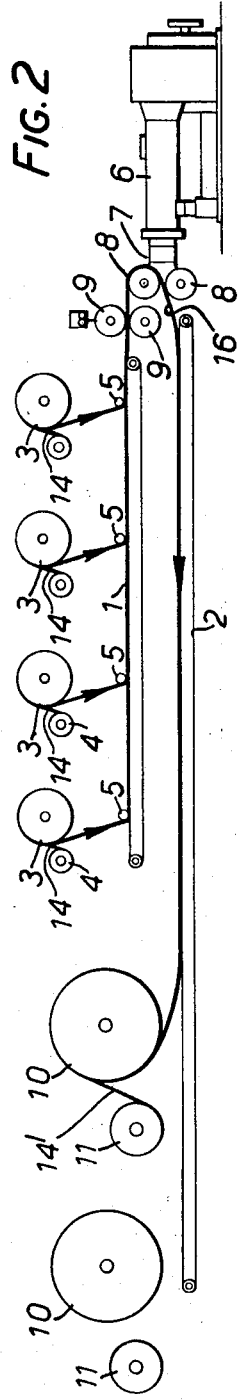
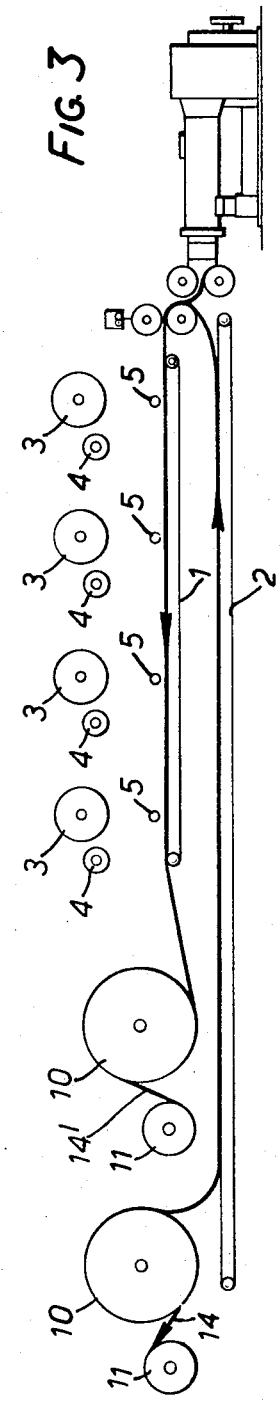
INVENTOR
REINHOLD RESCHKE
BY
Mason, Mason & Albright
ATTORNEYS United States Patent Office 3,711,348
Patented Jan. 16, 1973

3,711,348
METHOD OF MAKING MULTI-PLY CONVEYOR BELTING
Reinhold Reschke, Hannover-Buchholz, Germany, assignor to Hermann Berstorff Maschinenbau G.m.b.H., Hannover-Kleefeld, Germany
Filed Oct. 15, 1970, Ser. No. 81,105
Claims priority, application Germany, Oct. 15, 1969, P 19 51 983.6
Int. Cl. B29h 7/22; F16g 1/00
U.S. Cl. 156—137
5 Claims

ABSTRACT OF THE DISCLOSURE

A plant for the manufacture of multi-ply conveyor belting includes two conveyor belts, a plurality of rolls each for carrying an individually completed ply, a calender arrangement for coating base fabric webs with rubber and two rolls for carrying the completed belt. Initially, the plies are wound on to the ply-carrying rolls, are then withdrawn simultaneously and passed through the calender arrangement, whereafter a rewind from one of the completed belt rolls via the calender enables an outer layer of rubber to be applied to the belt.

BACKGROUND OF THE INVENTION (1) Field of the invention

The invention relates to a plant for manufacturing conveyor belting.

(2) Description of the prior art

For the assembly and construction of conveyor belting, use has hitherto been made of calendering equipment composed of separate machines. With such equipment, however, it is not possible to make a finished conveyor belt, but only a web of canvas friction-dressed with rubber. A normal conveyor belt consists, however, of multiple (preferably four) friction-dressed layers of canvas, with a thick rubber jacketing sheet and a rubber cover sheet.

The calendering equipment hitherto proposed for this purpose consists of a device for unwinding the web of canvas, a splicing press for fastening the start of a fresh roll of canvas to the end of an unwound roll and a means for storing the unwound canvas web, to ensure that the process may continue interruptedly when the empty unwound rolls are replaced by full ones.

A take-off mechanism is also required, for withdrawing canvas web from the storage arrangement, as well as a device for pre-heating the canvas, into which the latter is fed before its introduction into the calender. Other essential requirements in previously proposed equipment are 4-roll F-type calenders, a cooling device, a compensating mechanism and a take-up roll.

The friction-dressed canvas obtained from the calendering equipment is then, according to the process proposed hitherto, pressed together in four plies on a laminating calender.

To apply the rubber cover sheet and jacket, sheets of about 1 mm. thickness are then formed in a calender. The 1 mm. thicknesses of rubber are then laminated, that is to say that for a normal conveyor belt some ten sheetts at a time of the 1 mm. material are assembled to form the cover sheet and jacket respectively. This requires the provision of take-off and take-up mechanisms as well as a laminating calender.

To produce the finished belting, the carcass consisting of four canvas plies friction-dressed with rubber is then provided first with its jacket and then, in a further working, with its rubber cover sheet.

This previously proposed method of making conveyor belting is thus extremely cumbersome.

An object of the invention is to provide plant with which conveyor belting can be made more efficiently.

SUMMARY OF THE INVENTION

According to the present invention there is provided in a plant for the manufacture of multi-ply conveyor belting a plurality of rolls each carrying a fabric web, a first belt conveyor, a second belt conveyor extending at least partially below the first belt conveyor, a calender arrangement disposed in a path extending between the two conveyors, and a coating-layer extruder arranged to deliver coating layer material to the calender arrangement whereby to coat a web passing through the calender arrangement.

BRIEF DESCRIPTION OF THE DRAWINGS

An embodiment of a plant in accordance with the invention will now be described, by way of example, with reference to the accompanying diagrammatic drawings, in which:

FIGS. 1 to 3 are side elevations of the plant shown in various operating configurations;

DESCRIPTION OF THE PREFERRED EMBODIMENT

Figure 4:
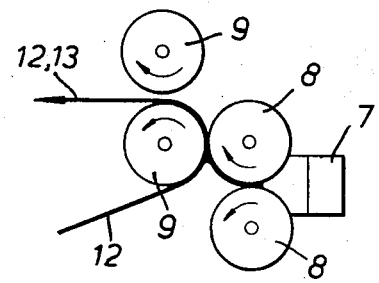
FIGS. 4 to 7 are fragmentary side elevations, to an enlarged scale, of the plant in various operating configurations.
Figure 5:
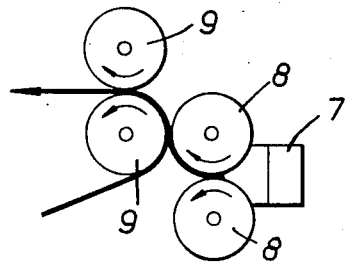

The plant comprises basically two belt conveyors 1 and 2, which can be run both in the clockwise and anti-clockwise senses. Rollers 3 and 4 are mounted rotatably well above the belt 1, and guide rollers 5 are rotatably mounted immediately above the belt.

An extruder 6 feeds the calender rolls 8, 9 through a nozzle 7. Sets of rollers 10 and 11, are rotatably mounted downstream of the belt 1 and above part of the belt 2.

The production of multi-ply conveyor belting proceeds as follows:

Initially four plies of canvas for the belting require to be friction-dressed with rubber. To that end, canvas 12 is unwound from the left-hand (as shown) roller 3 and passed about the guide roller 5 on to the conveyor 1, whence it is taken up by the conveyor 2 and taken to the calender rolls 8, 9 (FIG. 1). In the calender rolls 8, 9, the canvas 12 is friction-dressed with rubber 13 discharged from the nozzle 7.

The rubber passes through the nip of the rolls 8 of the calender, comes into contact with the canvas 12 in the nip of the rolls 9 and, since the upper roll 8 is arranged to run faster than the lower roll 9, is to some extent rubbed into the canvas 12 (FIG. 4).

The rubber-dressed canvas 12/13 then emerges from the calender, is taken up by the reversible belt 1, guided about the roller 5 on the extreme right and wound up on the roller 4 on the extreme right, together with a linen runner 14, which is unwound from the roller 3.

In this way, four rolls of canvas friction-dressed with rubber are produced successively, these being stored as indicated in FIG. 2.

In the assembly of the individual canvas plies to form a belt, it is very important that the tension should be uniform in all of them.

Uniform tension within the friction-dressed plies 12/13 themselves is achieved by the identical method of production used for all four plies. The four friction-dressed plies 12/13, however, must also be assembled together under uniform tension. This is achieved by unwinding the rolls 3 of friction-dressed canvas 12/13 about the guide rolls 5, during which the intermediate linen runners 14 are wound back on to the rollers 4 (FIG. 2). The individual plies 12/13 are carried by the endless belt 1 to the calender 8/9 and laminated in the nip between the rolls 9 (FIG. 6).

Figure 6:
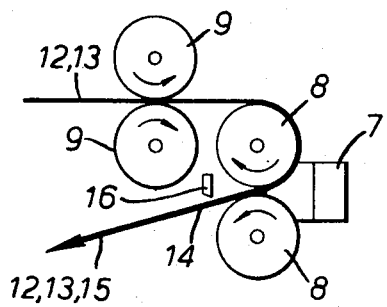
Figure 8:
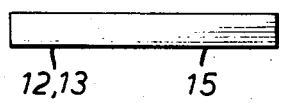
FIG. 8 is a cross-section of four friction-dressed plies of canvas of the conveyor belting produced by the plant, after application of a rubber outer coating.

The laminated plies 12/13 are then led about the upper roll 8 and faced, in the nip between the rolls 8, with a coating of rubber, the so-called jacket or outer cover, 15 (FIGS. 6 and 8).

The edges of the assembly 12/13/15 projecting at the side are trimmed off by a cutter 16 to leave protective edge strips of coating-layer material so that the fabric webs are fully enclosed. The carcass, now rubber-jacketed (FIG. 8), is then taken by the endless belt conveyor 2 to the right-hand one of the two rollers 10 where it is wound up together with a linen runner 14' taken from the roller 11.

Figure 9:
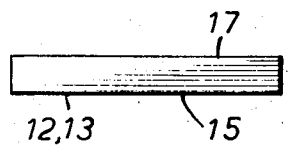
FIG. 9 is a cross-section of the completed belting produced by the plant.

For applying a rubber cover sheet, 17 (FIG. 9) to the top face of the assembly composed of the parts 12, 13 and 15, this carcass, which is wound up on the roller 10, is unwound from the right-hand roller 10 and moved to the left-hand roller as indicated in FIG. 3.

Figure 7:
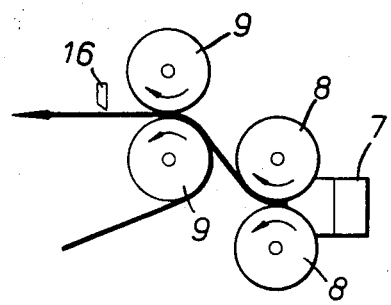

The carcass 12/13/15 jacketed with rubber on one face is then unwound from the roller 10, taken by the endless belt 2 to the calender 8/9 and faced, between the rolls 9, with a further thick rubber cover sheet 17, supplied by the nozzle 7 (FIGS. 3 and 7).

As the left-hand roller 10 in FIG. 3 is unwound, the linen runner 14 is wound on to the corresponding roller 11.

The finished conveyor belt is then trimmed on both sides to the desired width with the aid of the cutter 16 and taken by the belt conveyor 1 to the right-hand roller 10 (FIG. 3), where it is wound up, together with the linen runner 14 taken from the roller 11.

When the conveyor belting has been vulcanised by means of a rotary press, for example, it is ready for despatch.

The plant hereinbefore described has the advantage that a finished article, namely a ready-made conveyor belt, can be produced as such in a far smaller space, whereas only a semi-finished article, that is to say a single layer of friction-dressed canvas, can be made with the equipment hitherto proposed.

Moreover, the plant hereinbefore described has the advantage of dispensing with pre-heating arrangements and thus economising in cylinder rolls, since the extruder used with this plant can be fed cold.

A further advantage is that single canvas plies can be friction-dressed by the plant. It is also possible to produce thicker rubber sheeting, so that lamination becomes superfluous.

I claim:

1. In a process for the manufacture of multi-ply conveyor belting the steps of
 unwinding fabric from a first rolled web of fabric,
 calendering extruded coating-layer material on to one face of the fabric,
 rewinding the coated fabric web to form a first rolled web of coated fabric,
 unwinding the fabric from a second rolled web of the fabric,
 calendering extruded coating-layer material on to one face of the fabric of the second rolled web,
 rewinding the coated fabric web to form a second rolled web of coated fabric,
 unwinding fabric from a third rolled web of fabric,
 calendering extruded coating-layer-material on to one face of the fabric of the third rolled web,
 rewinding the coated fabric web to form a third rolled web of coated fabric,
 unwinding the rolled webs of coated fabric simultaneously under conditions of uniform tension,
 superposing the webs of coated fabric with the coated faces in contact with the uncoated faces, and
 feeding the superposed webs to a calendering station.

2. A process according to claim 1, comprising the further steps of
 unwinding fabric from a fourth rolled web of fabric,
 calendering extruded coating-layer material on to one face of the fabric of the fourth rolled web,
 rewinding the coated fabric web to form a fourth rolled web of coated fabric.

3. In a process according to claim 1, the further step of coating one of the external faces of the superposed webs with extruded coating material.

4. A process according to claim 3 comprising the steps of
 conveying the superposed and coated webs away from the calendering station and
 winding the webs to form a roll.

5. A process according to claim 4, comprising the further steps of
 unwinding the webs from the roll,
 conveying the webs to the calendering station and
 calendering a layer of extruded coating material on to the other external face of the superposed webs.

References Cited

UNITED STATES PATENTS

| | | | |
|---|---|---|---|
| 1,099,763 | 6/1914 | Parker | 156—231 X |
| 3,216,457 | 11/1965 | Zavasnik | 156—190 X |
| 3,053,310 | 9/1962 | Spooner | 156—324 X |
| 3,432,373 | 3/1969 | McMahon | 156—231 X |

PHILIP DIER, Primary Examiner

U.S. Cl. X.R.

74—232; 117—111; 156—190, 231, 324, 543